(12) United States Patent
Hayashi et al.

(10) Patent No.: US 9,046,645 B2
(45) Date of Patent: Jun. 2, 2015

(54) ANTIREFLECTION FILM, METHOD FOR PRODUCING ANTIREFLECTION FILM, POLARIZER AND IMAGE DISPLAY DEVICE

(75) Inventors: Mariko Hayashi, Tokyo (JP); Tomoyuki Horio, Tokyo (JP); Yoshihiro Nishimura, Tokyo (JP); Yuya Inomata, Tokyo (JP); Hiroshi Nakamura, Tokyo (JP); Mayu Youki, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 13 days.

(21) Appl. No.: 13/979,572
(22) PCT Filed: Jan. 16, 2012
(86) PCT No.: PCT/JP2012/050696
§ 371 (c)(1),
(2), (4) Date: Aug. 30, 2013
(87) PCT Pub. No.: WO2012/096400
PCT Pub. Date: Jul. 19, 2012

(65) Prior Publication Data
US 2013/0329297 A1 Dec. 12, 2013

(30) Foreign Application Priority Data

Jan. 14, 2011 (JP) .................................. 2011-006379

(51) Int. Cl.
*G02B 27/00* (2006.01)
*G02B 5/30* (2006.01)
(Continued)

(52) U.S. Cl.
CPC . *G02B 1/111* (2013.01); *G02B 1/04* (2013.01); *C08J 5/24* (2013.01); *C08L 2205/02* (2013.01);
(Continued)

(58) Field of Classification Search
CPC ....... C08L 1/10; C08L 2205/02; C08L 63/00;
C08K 5/523; C08J 5/18; C08J 2333/08;
C08J 2300/20; C08J 5/24; C03C 20/002;
C03C 4/00; G02B 1/04; G02B 1/118; G02B 5/305; G02B 1/105; G02B 1/11
USPC ........ 359/488.01, 492.01, 586, 601; 528/374;
427/487; 428/1.32, 1.33, 220; 349/137
See application file for complete search history.

(56) References Cited

U.S. PATENT DOCUMENTS 8,039,065 B2 * 10/2011 Ikeda et al. .................. 428/1.32
2007/0121211 A1 * 5/2007 Watanabe et al. ............. 359/601
(Continued)

FOREIGN PATENT DOCUMENTS

CN 1118607 3/1996
CN 1742213 3/2006
(Continued)

*Primary Examiner* — Evelyn A Lester
(74) *Attorney, Agent, or Firm* — Hamre, Schumann, Mueller & Larson, P.C.

(57) ABSTRACT

The claimed invention provides an antireflection film including a light-transmitting substrate, a hard coat layer, and a low-refractive-index layer, the hard coat layer and the low-refractive-index layer being formed on the light-transmitting substrate, the low-refractive-index layer including a (meth) acrylic resin, hollow silica particles, reactive silica particles, and two kinds of antifouling agents, the hollow silica particles having an average particle size of 40 to 80 nm and a blending ratio to the (meth)acrylic resin, represented by a ratio: Amount of hollow silica particles/Amount of (meth)acrylic resin, of 0.9 to 1.4, the amount of the reactive silica particles being 5 to 60 parts by mass based on 100 parts by mass of the (meth) acrylic resin, the antifouling agents including an antifouling agent that contains a fluorine compound and an antifouling agent that contains a fluoro-silicone compound.

9 Claims, 1 Drawing Sheet

(51) Int. Cl.

| | |
|---|---|
| *C09K 19/00* | (2006.01) |
| *C08J 7/18* | (2006.01) |
| *G02F 1/1335* | (2006.01) |
| *G02B 1/04* | (2006.01) |
| *C08J 5/24* | (2006.01) |
| *C03C 21/00* | (2006.01) |
| *C08L 63/00* | (2006.01) |
| *C08L 1/10* | (2006.01) |
| *C08K 5/523* | (2006.01) |
| *C08J 5/18* | (2006.01) |

(52) U.S. Cl.
 CPC ............... *C03C 21/002* (2013.01); *C08L 63/00* (2013.01); *C08L 1/10* (2013.01); *G02B 5/305* (2013.01); *C08K 5/523* (2013.01); *C08J 2300/20* (2013.01); *C08J 5/18* (2013.01); *C08J 2333/08* (2013.01); *G02B 5/3033* (2013.01); *G02B 27/0006* (2013.01); *G02F 1/1335* (2013.01); *G02F 1/133502* (2013.01)

(56) References Cited

U.S. PATENT DOCUMENTS

| | | | | |
|---|---|---|---|---|
| 2007/0146887 | A1* | 6/2007 | Ikeda et al. | 359/586 |
| 2008/0234461 | A1* | 9/2008 | Fukushige | 528/374 |
| 2010/0134879 | A1* | 6/2010 | Yoshihara et al. | 359/361 |

FOREIGN PATENT DOCUMENTS

| | | |
|---|---|---|
| CN | 1894601 | 1/2007 |
| CN | 101738651 | 6/2010 |
| JP | 2001-100004 | 4/2001 |
| JP | 2003-292831 | 10/2003 |
| JP | 2006-018233 | 1/2006 |
| JP | 2009-053691 | 3/2009 |
| JP | 2009-288809 | 12/2009 |
| JP | 2010-085983 | 4/2010 |
| JP | 2010-152311 | 7/2010 |
| JP | 2011-059699 | 3/2011 |
| WO | 2004/066001 | 8/2004 |

* cited by examiner

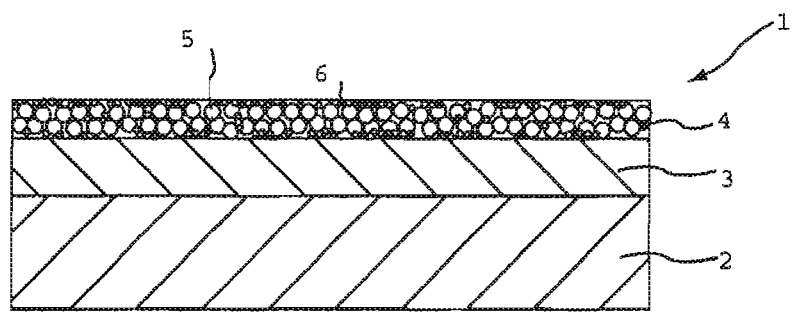

ANTIREFLECTION FILM, METHOD FOR PRODUCING ANTIREFLECTION FILM, POLARIZER AND IMAGE DISPLAY DEVICE

TECHNICAL FIELD

The claimed invention relates to an antireflection film, a method for producing an antireflection film, a polarizer, and an image display device.

BACKGROUND ART

In image display devices such as cathode ray tube displays (CRT), liquid crystal displays (LCD), plasma displays (PDP), electroluminescence displays (ELD), and field emission displays (FED), image display surfaces are required to reduce the reflection of light from outside for improvement of visibility. A general method for improving the visibility is using an antireflection film containing an antireflection layer as a light-transmitting substrate to reduce the reflection on the display surface of an image display device.

Conventional antireflection films are known to contain, on the outermost surface, a low-refractive-index layer with a lower refractive index than a light-transmitting substrate.

Such low-refractive-index layers are required to have a low refractive index to improve the antireflection performance of the antireflection film, a high hardness and a slip property to prevent scratches so as to be mounted on the outermost surface of the film, and excellent optical properties such as transparency.

One example of antireflection films containing a low-refractive-index layer on the outermost surface is disclosed in Patent Literature 1. This antireflection film contains a low-refractive-index layer including hollow silica particles inside, which is formed from a coating solution including hollow silica particles, a binder resin such as acrylate, and the like.

As image display devices are required to have a quite high display quality, the antireflection performance of antireflection films is recently required to achieve a higher level.

However, conventional antireflection films containing a low-refractive-index layer with hollow silica particles cannot achieve sufficient antireflection performance corresponding to the recent high display quality.

Patent Literature 2 and the like disclose methods for adding a fluorine atom-containing polymer or monomer to a material for low-refractive-index layer, for example.

The fluorine atom-containing polymer or monomer has a lower refractive index than, for example, a binder resin shown in Patent Literature 1. However, a low-refractive-index layer formed from such a composition cannot achieve a sufficiently low refractive index. If the amount of the fluorine atom-containing polymer or monomer is increased so that a sufficiently low refractive index is achieved, the hardness of the low-refractive-index layer problematically decreases.

Patent Literatures 3, 4, and 5 disclose antireflection films that contain a low-refractive-index layer including a fluoropolymer and hollow silica particles.

Such a low-refractive-index layer including a fluoropolymer and hollow silica particles can achieve a lower refractive index.

However, even in the case of using such a low-refractive-index layer including a fluoropolymer and hollow silica particles, sufficient increase in the amount of the fluoropolymer to reduce the refractive index problematically causes an insufficient hardness of the low-refractive-index layer.

Thus, antireflection films are required to contain a low-refractive-index layer with a sufficient surface hardness and a lower refractive index, and to exert high antireflection performance.

In addition, such an antireflection film is required to have an excellent slip property because it is normally mounted on the outermost surface of an image display device.

CITATION LIST

Patent Literature

Patent Literature 1: JP 2003-292831 A
Patent Literature 2: JP 2001-100004 A
Patent Literature 3: JP 2009-288809 A
Patent Literature 4: JP 2010-152311 A
Patent Literature 5: JP 2011-059699 A

SUMMARY OF INVENTION

Technical Problem

In view of the current situation, the claimed invention aims to provide an antireflection film including a low-refractive-index layer with a sufficient surface hardness, a sufficient slip property, and a sufficiently low refractive index, and being excellent in antireflection performance and antifouling performance such as fingerprint removability and marker repellency; and a polarizer and an image display device using the antireflection film.

Solution to Problem

With reference to the accompanying figure, an aspect of the claimed invention is an antireflection film 1 including a light-transmitting substrate 2, a hard coat layer 3, and a low-refractive-index layer 4. The hard coat layer and the low-refractive-index layer are formed on the light-transmitting substrate. The low-refractive-index layer includes a (meth)acrylic resin, hollow silica particles 5, reactive silica particles 6, and two kinds of antifouling agents, the hollow silica particles having an average particle size of 40 to 80 nm and a blending ratio to the (meth)acrylic resin, represented by a ratio: Amount of hollow silica particles/Amount of (meth)acrylic resin, of 0.9 to 1.4, the amount of the reactive silica particles being 5 to 60 parts by mass based on 100 parts by mass of the (meth)acrylic resin. The antifouling agents include an antifouling agent that contains a fluorine compound and an antifouling agent that contains a fluoro-silicone compound.

The hollow silica particles of the antireflection film of the claimed invention preferably have an average particle size of 45 to 70 nm.

The reactive silica particles preferably contain a UV-curable functional group and have an average particle size of 1 to 25 nm.

When the blending ratio of the hollow silica particles to the (meth)acrylic resin, represented by a ratio: Amount of hollow silica particles/Amount of (meth)acrylic resin, is 0.9 to 1.1, the amount of the reactive silica particles is preferably 5 to 40 parts by mass based on 100 parts by mass of the (meth)acrylic resin, and when the blending ratio of the hollow silica particles to the (meth)acrylic resin is 1.1 to 1.4, the amount of the reactive silica particles is preferably 40 to 60 parts by mass based on 100 parts by mass of the (meth)acrylic resin.

The (meth)acrylic resin is preferably a polymer or a copolymer of at least one monomer selected from the group consisting of pentaerythritol tri(meth)acrylate, dipentaerythritol hexa(meth)acrylate, pentaerythritol tetra(meth)acrylate, dipentaerythritol penta(meth)acrylate, trimethylolpropane tri(meth)acrylate, dipentaerythritol tetra(meth)acrylate and an isocyanuric acid EO-modified tri(meth)acrylate.

Another aspect of the claimed invention is a method for producing an antireflection film that includes a hard coat layer and a low-refractive-index layer on a light-transmitting substrate, including the step of applying a coating solution for low-refractive-index layer on the hard coat layer, and drying and curing the resultant coating film to form the low-refractive-index layer on the hard coat layer, the hard coat layer being formed on the light-transmitting substrate, the coating solution containing a (meth)acrylic monomer, hollow silica particles, reactive silica particles, two kinds of antifouling agents, and a solvent, the hollow silica particles having an average particle size of 40 to 80 nm and a blending ratio to the (meth) acrylic resin, represented by a ratio: Amount of hollow silica particles/Amount of (meth)acrylic resin, of 0.9 to 1.4, the amount of the reactive silica particles being 5 to 60 parts by mass based on 100 parts by mass of the (meth)acrylic resin, the antifouling agents including an antifouling agent that contains a fluorine compound and an antifouling agent that contains a fluoro-silicone compound, the solvent being a mixed solvent of methyl isobutyl ketone and a propylene glycol monomethyl ether.

In the method for producing an antireflection film of the claimed invention, the blending ratio between the methyl isobutyl ketone and the propylene glycol monomethyl ether, represented by a ratio: Methyl isobutyl ketone/Propylene glycol monomethyl ether, is preferably 95/5 to 30/70.

Still another aspect of the claimed invention is a polarizer including a polarizing element, the polarizing element including the antireflection film on a polarizing element surface.

Still yet another aspect of the claimed invention is an image display device including the antireflection film or the polarizer on an outermost surface.

Details of the claimed invention are described in the following.

An aspect of the claimed invention is an antireflection film including a light-transmitting substrate, a hard coat layer, and a low-refractive-index layer, the hard coat layer and the low-refractive-index layer being formed on the light-transmitting substrate.

The present inventors intensively studied on antireflection films having the above structure, and thereby found that an antireflection film having specific features are more excellent in all of scratch resistance, contamination resistance, and a slip property, compared to conventional films. The specific features are that the low-refractive-index layer is formed from a coating solution for low-refractive-index layer, the coating solution containing a (meth) acrylic monomer, hollow silica particles, reactive silica particles, two kinds of antifouling agents, and a solvent; that the particle size and the amount of the hollow silica particles each are set within a specific range; that the amount of the reactive silica particles is set within a specific range; and that the antifouling agents are prepared by combination of two kinds of antifouling agents containing specific compositions (for example, combination of one antifouling agent improving fingerprint resistance and fingerprint removability and another antifouling agent improving marker repellency, marker removability, slip property, and scratch resistance). Thus, the claimed invention was completed.

Details of each layer forming the antireflection film of the claimed invention are shown in the following.

(Low-Refractive-Index Layer)

The low-refractive-index layer refers to a layer having a lower refractive index than other components of the antireflection film of the claimed invention, such as a light-transmitting substrate and a hard coat layer.

The low-refractive-index layer of the antireflection film of the claimed invention contains a (meth) acrylic resin, hollow silica particles, reactive silica particles, and two kinds of antifouling agents.

The (meth)acrylic resin serves as a binder component of the hollow silica particles and the reactive silica particles described below in the low-refractive-index layer. The term "(meth)acryl" herein means acryl or methacryl.

Examples of the (meth)acrylic resin include a polymer or copolymer of a (meth)acrylic monomer. The (meth)acrylic monomer is not particularly limited, and preferable examples include pentaerythritol tri(meth)acrylate, dipentaerythritol hexa(meth)acrylate, pentaerythritol tetra(meth)acrylate, dipentaerythritol penta(meth)acrylate, trimethylolpropane tri(meth)acrylate, dipentaerythritol tetra(meth)acrylate, and isocyanuric acid EO-modified tri(meth)acrylate.

These (meth)acrylate monomers may be partially modified in their molecular frame with ethylene oxide, propylene oxide, caprolactone, isocyanuric acid, alkyls, cyclic alkyls, aromatics, or a bisphenol.

Each of these (meth)acrylic monomers may be used alone or two or more of them may be used in combination. These (meth) acrylic monomers satisfy the low-refractive-index range shown below and are excellent in curing reactivity, thereby improving the hardness of the resulting low-refractive-index layer.

A polymer or copolymer resulting from curing of the (meth)acrylic monomer shown above preferably has a refractive index of 1.47 to 1.53.

Achieving a refractive index of lower than 1.47 is virtually impossible and a refractive index higher than 1.53 may prevent production of a low-refractive-index layer having a sufficiently low refractive index.

The (meth) acrylic monomer preferably has a weight average molecular weight of 250 to 1000. A weight average molecular weight of less than 250 causes reduced number of functional groups, possibly leading to a low-refractive-index layer with a reduced hardness. A weight average molecular weight of higher than 1000 generally causes a smaller functional group equivalent (number of functional groups/molecular weight) and thereby a reduced crosslinking density, possibly preventing production of a low-refractive-index layer with a sufficient hardness.

The weight average molecular weight of the (meth)acrylic monomer can be determined by gel permeation chromatography (GPC) using a polystyrene standard. A solvent such as tetrahydrofuran or chloroform may be used for a GPC mobile phase. The measurement may be performed by combination use of a tetrahydrofuran column and a chloroform column, both being commercially available. Examples of the commercial columns include Shodex GPC KF-801 and GPC KF-800D (trade names, produced by Showadenkosya Co., Ltd.). For detection, an RI (differential refractive index) detector and a UV detector may be used. With the use of the solvent, columns, and detectors, the weight-average molecular weight is appropriately measured on a GPC system such as Shodex GPC-101 (produced by Showadenkosya Co., Ltd.).

The hollow silica particles are a component which reduces the refractive index of the low-refractive-index layer while keeping the layer strength thereof. The term "hollow silica particles" refers to silica particles containing a gas filled in the particles and/or having a gas-containing porous structure, and their refractive index is reduced inversely proportional to the proportion of the gas contained, which is different from the refractive index of original silica particles.

Since the antireflection film of the claimed invention contains a low-refractive-index layer containing the hollow silica particles, the antireflection film can achieve a desired reflectance without containing a fluorine atom-containing polymer or monomer, unlike conventional low-refractive-index layers. In addition, the low-refractive-index layer of the claimed invention has a proper hardness and a lower refractive index.

The hollow silica particles of the antireflection film of the claimed invention have an average particle size of 40 to 80 nm. An average particle size of less than 40 nm causes an insufficient porosity preventing a sufficiently low refractive index, resulting in insufficient antireflection performance of the antireflection film of the claimed invention. In contrast, an average particle size of more than 80 nm causes roughness on the surface of the low-refractive-index layer, bringing a deteriorated scratch resistance of the antireflection film of the claimed invention and a reduced strength of the hollow silica particles themselves, thereby resulting in a reduction in the film strength of the low-refractive-index layer.

The lower limit of the average particle size of the hollow silica particles is preferably 45 nm, and the upper limit is preferably 70 nm. An average particle size within this range enables a desired reflectance with the strength of the low-refractive-index layer maintained.

The average particle size of the hollow silica particles refers to the measurement value obtained by a dynamic light scattering method, observation with TEM cross-section analysis, or the like.

Specific examples of the hollow silica particles are not particularly limited, and hollow silica particles prepared with the technique disclosed in JP 2001-233611 A are given as a preferable example. The hollow silica particles are easily produced and have a high hardness. Therefore, the hollow silica particles mixed with an organic binder material can form a low-refractive-index layer controlled to have an improved layer strength and a low refractive index.

The hollow silica particles preferably have a porosity of 6.4 to 80.0%. A porosity of less than 6.4% is not enough to produce a low-refractive-index layer with a sufficiently low refractive index, possibly deteriorating the antireflection performance of the antireflection film of the claimed invention. In contrast, a porosity of more than 80.0% reduces the strength of the hollow silica particles, possibly resulting in a low-refractive-index layer with an insufficient strength. The lower limit of the porosity of the hollow silica particles is more preferably 8.5%, and the upper limit is more preferably 76.4%. Hollow silica particles having a porosity within this range enable production of low-refractive-index layers with a sufficiently low refractive index and an excellent strength.

The blending ratio of the hollow silica particles to the (meth) acrylic resin, represented by a ratio: Amount of hollow silica particles/Amount of (meth) acrylic resin, in the antireflection film of the claimed invention is 0.9 to 1.4. A blending ratio lower than 0.9 is not enough to produce a low-refractive-index layer with a sufficiently low refractive index, thereby deteriorating the antireflection performance of the antireflection film of the claimed invention. A blending ratio of higher than 1.4 problematically reduces the scratch resistance of the antireflection film of the claimed invention. The lower limit of the blending ratio is preferably 1.0, and the upper limit is preferably 1.3. A blending ratio within this range enables a desired reflectance of the low-refractive-index layer with the strength thereof maintained.

The reactive silica particles are silica particles containing a reactive functional group on the surface. Reactive silica particles improve the surface hardness of the low-refractive-index layer.

The reactive functional group is not particularly limited, and those crosslinkable with the (meth)acrylic resin may be appropriately selected. Preferable examples include a UV-curable functional group.

Specific examples of the reactive functional group include ethylenically unsaturated bond-containing groups (e.g. (meth)acryloyl group, vinyl group, allyl group) and epoxy groups. Preferable among these are ethylenically unsaturated bond-containing groups.

The reactive silica particles are preferably covered with an organic component on at least a partial surface, and preferably have a reactive functional group introduced by the organic component on the particle surface.

The organic component herein refers to a component including carbon. Examples of the silica particles covered with an organic component on at least a partial surface include; silica particles in which a hydroxyl group on the surface reacts with a compound including an organic component such as a silane coupling agent to bond the organic component to a partial surface; silica particles in which a hydroxyl group on the surface reacts with a compound including an organic component containing an isocyanate group to bond the organic component to a partial surface; and silica particles in which an organic component is bonded to a hydroxyl group on the surface by an interaction such as hydrogen bonding.

The method for preparing the reactive silica particles which are covered with an organic component on at least a partial surface and have a reactive functional group introduced by the organic component on the surface is not particularly limited, and any conventional methods may be used.

The reactive silica particles preferably have an average particle size of 1 to 25 nm. An average particle size of less than 1 nm may not contribute to improvement of the hardness of the low-refractive-index layer. An average particle size of more than 25 nm reduces the transparency of the low-refractive-index layer, possibly leading to deterioration of the transmittance and increase in the haze value. In addition, the low-refractive-index layer may have defects due to such an average particle size. The lower limit of the average particle size of the reactive silica particles is more preferably 5 nm, and the upper limit is more preferably 20 nm.

The average particle size of the reactive silica particles herein refers to a diameter obtainable by the following process: the reactive silica particles in the solution are measured by the dynamic light scattering method; the obtained particle size distribution is converted into a cumulative distribution; and then the particle size at 50% (d50 median size) is determined as the average particle size. The average particle size can be determined using a Microtrac particle size analyzer by Nikkiso Co., Ltd. Also, observation by a TEM cross-section analysis is applicable.

The reactive silica particles of the antireflection film of the claimed invention are preferably dispersed into single particles. However, the reactive silica particles may contain some reactive silica particles (e.g. 3 to 20 particles, preferably 3 to 10 particles) bonded together by inorganic chemical bonding (chain particles). Such chain particles enable improvement of the scratch resistance of the low-refractive-index layer.

The amount of the chain particles is preferably 0 to 80 mass % in 100 mass % of the total reactive silica particles (single particles+chain particles). An amount more than 80 mass % may cause defects of the low-refractive-index layer or deterioration of the steel wool resistance of the antireflection film of the claimed invention. The lower limit of the amount of the chain particles is more preferably 10 mass %, and the upper limit is more preferably 70 mass %.

Examples of the inorganic chemical bonding include ionic bonding, metal bonding, coordinate bonding, and covalent bonding. Preferable among these are types of bonding in which spherically bonded silica particles are not dispersed even when added to a polar solvent. Specifically, preferable are metal bonding, coordinate bonding, and covalent bonding, and more preferable is covalent bonding. Examples of the polar solvent include water and lower alcohols such as methanol, ethanol, and isopropyl alcohol.

The average number of the reactive silica particles in the chain particles is determined by observing a cross section of the low-refractive-index layer on photos taken with a SEM or a TEM, randomly selecting 100 pieces of the chain particles, counting the number of the particles in each piece, and calculating the average value. The average particle size of the chain particles refers to an average value of the lengths of the longer side and the lengths of the shorter side of the chain particles.

Such chain particles in which some reactive silica particles are bonded together are obtainable by a conventional method. Examples of the method include a method of adjusting the concentration or the pH of a dispersion of monodispersed reactive silica particles and then performing a hydrothermal treatment at an elevated temperature of 100° C. or more. Here, a binder component may be optionally added to promote the bonding of the reactive silica particles.

In addition, the dispersion of the reactive silica particles may be passed through an ion exchange resin to remove ions. Such an ion exchange treatment enables promotion of the bonding of the reactive silica particles. The ion exchange treatment may be carried out again after the hydrothermal treatment.

The amount of the reactive silica particles in the antireflection film of the claimed invention is 5 to 60 parts by mass based on 100 parts by mass of the (meth)acrylic resin. The reactive silica particles in an amount of less than 5 parts by mass cannot sufficiently achieve the hardness of the low-refractive-index layer. The reactive silica particles in an amount of more than 60 parts by mass causes an insufficient adhesion between the low-refractive-index layer and a hard coat layer described below. Besides, sufficient effects are not achieved in proportion to the added amount of the reactive silica particles, causing an increase in the production cost and in the reflectance. The lower limit of the amount of the reactive silica particles is preferably 10 parts by mass, and the upper limit is preferably 50 parts by mass. The reactive silica particles in an amount within this range enable improvement of the film strength of the low-refractive-index layer without deteriorating the properties such as reflectance.

In order for a more improved scratch resistance of the low-refractive-index layer, the amount of the reactive silica particles of the low-refractive-index layer is preferably appropriately adjusted according to the amount of the hollow silica particles.

Specifically, when the blending ratio of the hollow silica particles to the (meth)acrylic resin, represented by a ratio: Amount of hollow silica particles/Amount of (meth) acrylic resin, is 0.9 to 1.1, the amount of the reactive silica particles is preferably 5 to 40 parts by mass based on 100 parts by mass of the (meth)acrylic resin.

When the blending ratio of the hollow silica particles to the (meth)acrylic resin is 1.1 to 1.4, the amount of the reactive silica particles is preferably 40 to 60 parts by mass based on 100 parts by mass of the (meth)acrylic resin.

In addition, the blending ratio of the total amount of the hollow silica particles and the reactive silica particles to the (meth)acrylic resin (amount of hollow silica particles+ amount of reactive silica particles/amount of (meth)acrylic resin) is preferably 0.8 to 2.0. A blending ratio within this range enables improvement of the film strength of the low-refractive-index layer without deteriorating the properties such as reflectance, thereby controlling occurrence of defects such as aggregation defects in the resulting low-refractive-index layers.

The low-refractive-index layer of the antireflection film of the claimed invention includes antifouling agents including an antifouling agent that contains a fluorine compound and an antifouling agent that contains a fluoro-silicone compound. The use of two different antifouling agents improves various properties: for example, the antifouling agent that contains a fluorine compound achieves excellent fingerprint resistance and excellent fingerprint removability in the antireflection film of the claimed invention; and the antifouling agent that contains a fluoro-silicone compound achieves excellent marker repellency, excellent marker removability, excellent slip property, and excellent scratch resistance in the antireflection film of the claimed invention. In addition, the occurrence of defects on the low-refractive-index layer can be controlled. Furthermore, a display device containing an antiglare film formed according to the claimed invention can provide excellent images.

The fluorine compound is preferably a reactive fluorine compound, and particularly preferably a fluorine-containing monomer containing an ethylenically unsaturated bond. Specific examples include fluoroolefins (such as fluoroethylene, vinylidene fluoride, tetrafluoroethylene, hexafluoropropylene, perfluorobutadiene, and perfluoro-2,2-dimethyl-1,3-dioxole).

The specific examples also include (meth)acrylate compounds containing a fluorine atom in a molecule such as 2,2,2-trifluoroethyl (meth)acrylate, 2,2,3,3,3-pentafluoropropyl (meth)acrylate, 2-(perfluorobutyl)ethyl (meth)acrylate, 2-(perfluorohexyl)ethyl (meth)acrylate, 2-(perfluorooctyl)ethyl (meth)acrylate, 2-(perfluorodecyl)ethyl (meth)acrylate, and methyl α-trifluoro(meth)acrylate; and fluorine-containing multi-functional(meth)acrylic acid ester compounds that contain a C1 to C14 fluoroalkyl, fluorocyclo alkyl, or fluoroalkylene group containing at least three fluorine atoms in a molecule, and at least two (meth)acryloyloxy groups.

Furthermore, the specific examples also include a fluoropolymer or oligomer containing a fluorinated alkylene group in the main chain, and a fluorinated polymer or oligomer containing a fluorinated alkylene group and a fluorinated alkyl group in the main chain and in a side chain. Among these, particularly preferably used is a fluorinated polymer containing a fluorinated alkylene group and a fluorinated alkyl group in the main chain and side chain because such a fluorinated polymer tends not to bleed out from the resulting low-refractive-index layer.

The amount of the fluorine compound is not particularly limited, and is preferably 1.0 to 10.0 parts by mass based on 100 parts by mass of the total amount of the hollow silica particles and the (meth)acrylic resin. The fluorine compound in an amount of less than 1.0 part by mass may cause the resulting antireflection film of the claimed invention to have insufficient fingerprint removability. The fluorine compound in an amount of more than 10.0 parts by mass may cause the resulting low-refractive-index layer to have a reduced slip property and a reduced hardness, and causes the resulting antireflection film of the claimed invention to have insufficient scratch resistance and deteriorated marker repellency. The lower limit of the amount of the fluorine compound is more preferably 2.0 parts by mass, and the upper limit is more preferably 8.0 parts by mass.

The amount of the fluoro-silicone compound is not particularly limited, and is preferably 0.5 to 15.0 parts by mass based on 100 parts by mass of the total amount of the hollow silica particles and the (meth)acrylic resin. The fluoro-silicone compound in an amount of less than 0.5 parts by mass may cause the resulting low-refractive-index layer to be insufficient in slip property and strength. This reduces the scratch resistance of the antireflection film of the claimed invention, thereby reducing the marker repellency and the marker removability. In contrast, the fluoro-silicone compound in an amount of more than 15.0 parts by mass may cause insufficient fingerprint removability and whitening of the resulting low-refractive-index layer. In addition, a coating solution for low-refractive-index layer described below may have a reduced coatability in the production of the low-refractive-index layer. The lower limit of the amount of the fluoro-silicone compound is more preferably 1.0 part by mass, and the upper limit is more preferably 10.0 parts by mass.

The low-refractive-index layer may contain other antifouling agents than the fluorine compound and the fluoro-silicone compound within the range where the effects of the claimed invention are not prevented.

Examples of those antifouling agents include silicone compounds.

Examples of the silicone compounds include (poly) dimethyl siloxanes, (poly) diethyl siloxanes, (poly) diphenyl siloxanes, (poly)methyl phenylsiloxanes, alkyl-modified (poly)dimethyl siloxanes, azo group-containing (poly)dimethyl siloxanes, dimethyl silicone, phenylmethyl silicone, alkyl/aralkyl-modified silicones, fluorosilicones, polyether-modified silicones, fatty acid ester-modified silicones, methyl hydrogen silicone, silanol group-containing silicones, alkoxy group-containing silicones, phenol group-containing silicones, methacryl-modified silicones, acryl-modified silicone, amino-modified silicones, carboxylic acid-modified silicones, carbinol-modified silicones, epoxy-modified silicones, mercapto-modified silicones, and polyether-modified silicones. Among these, particularly preferably used are silicones having a dimethyl siloxane structure because such a silicone tends not to bleed out from the resulting low-refractive-index layer.

The low-refractive-index layer of the antireflection film of the claimed invention preferably has a refractive index of 1.40 or lower. A low-refractive-index layer with a refractive index of higher than 1.40 may cause insufficient antireflection performance on the resulting antireflection film of the claimed invention, and thereby the antireflection film may not be suitably used for recent image display devices with a high-level display quality. The refractive index is more preferably 1.38 or lower.

The film thickness (nm) $d_A$ of the low-refractive-index layer preferably meets the following formula (I):

$$d_A = m\lambda/(4n_A) \quad (I)$$

(in the formula, $n_A$ represents the refractive index of a low-refractive-index layer, m indicates a positive odd number, preferably 1, and $\lambda$ represents a wavelength preferably in a range of 480 to 580 nm).

The low-refractive-index layer of the claimed invention preferably meets the following formula (II):

$$120 < n_A d_A < 145 \quad (II)$$

in order to achieve a low reflectance.

The low-refractive-index layer preferably has a haze value of 1% or lower. A haze value of higher than 1% reduces the light transmittance of the antireflection film of the claimed invention, possibly reducing the display quality of the resulting image display device. The haze value is more preferably 0.5% or lower. A haze value herein refers to a value obtained in conformity with JIS K7136.

The low-refractive-index layer preferably has a hardness of 2H or higher, and more preferably 3H or higher in the pencil hardness test in accordance with JIS K5400. Also, the abrasion loss of a test piece of the low-refractive-index layer is preferably as small as possible in the Taber test in accordance with JIS K5400.

Such a low-refractive-index layer may be formed by applying the coating solution for low-refractive-index layer, that contains (meth) acrylic monomer, hollow silica particles, reactive silica particles, an antifouling agent, and a solvent, to an object to form a coating film, and drying and curing the coating film.

The solvent contained in the coating solution for low-refractive-index layer is not particularly limited, and examples thereof include alcohols such as methanol, ethanol, propanol, isopropanol, n-butanol, s-butanol, t-butanol, benzyl alcohol, and propylene glycol monoethyl ether; ketones such as acetone, methyl ethyl ketone, methyl isobutyl ketone, cyclohexanone, heptanone, diisobutyl ketone, and diethyl ketone; esters such as methyl acetate, ethyl acetate, propyl acetate, butyl acetate, methyl formate, ethyl formate, propyl formate, butyl formate, and propylene glycol monomethyl ether acetate; aliphatic hydrocarbons such as hexane and cyclohexane; halogenated hydrocarbons such as methylene chloride, chloroform, and carbon tetrachloride; aromatic hydrocarbons such as benzene, toluene, and xylene; amides such as dimethyl formamide, dimethyl acetamide, and n-methylpyrrolidone; ethers such as diethyl ether, dioxane, and tetrahydrofuran; and etheralcohols such as 1-methoxy-2-propanol. Preferable among these are methyl isobutyl ketone, methyl ethyl ketone, isopropyl alcohol (IPA), n-butanol, s-butanol, t-butanol, propylene glycol monoethyl ethers, and propylene glycol monomethyl ether acetate, and most preferable is a mixed solvent containing methyl isobutyl ketone and propylene glycol monoethyl ether.

The use of the mixed solvent containing methyl isobutyl ketone and propylene glycol monoethyl ether as the solvent prevents color unevenness and aggregation of the hollow silica particles of the low-refractive-index layer to be formed, thereby providing an antireflection film containing a high-quality low-refractive-index layer.

In the case that the solvent contains methyl isobutyl ketone and propylene glycol monoethyl ether, the blending ratio of these, represented by a ratio: Methyl isobutyl ketone/Propylene glycol monomethyl ether, is preferably 95/5 to 30/70. A blending ratio of lower than 95/5 may cause a defect of color unevenness on the resulting low-refractive-index layer. In contrast, a blending ratio of higher than 30/70 may deteriorate the antifouling performance of the resulting low-refractive-index layer and may cause whitening of the low-refractive-index layer because of blushing (condensation of moisture in the air on the low-refractive-index layer due to an increased drying rate). The lower limit of the blending ratio is more preferably 85/15, and the upper limit is more preferably 40/60.

The coating solution for low-refractive-index layer may contain other components according to need.

Examples of those other components include photopolymerization initiators, leveling agents, curing agents, polymerization accelerants, viscosity conditioning agents, antiglare agents, antistatic agents, and resins not mentioned above.

Examples of the photopolymerization initiator include acetophenones (e.g. 1-hydroxy-cyclohexyl-phenyl-ketone, under the trade name of IRGACURE 184 by BASF, and 2-methyl-1[4-(methylthio)phenyl]-2-morpholino propane-1-on, under the trade name of IRGACURE 907 by BASF), benzophenones, thioxanthones, benzoin, benzoin methyl ether, aromatic diazonium salts, aromatic sulfonium salts, aromatic iodonium salts, metallocene compounds, and benzoin sulfonate esters. Each of these may be used alone, or two or more of them may be used in combination.

The amount of the photopolymerization initiator is preferably 0.1 to 10 parts by mass based on 100 parts by mass of the (meth)acrylic monomer.

Any known leveling agent, crosslinking agent, curing agent, polymerization accelerant, viscosity conditioning agent, antiglare agent, antistatic agent, and resins not mentioned above may be used.

The coating solution for low-refractive-index layer is preferably adjusted to have a viscosity in a range of 0.5 to 5 cps (25° C.), and preferably 0.7 to 3 cps (25° C.) so as to show a preferable coatability. The coating solution with a viscosity in the above range enables formation of an antireflection film which is excellent for visible light, formation of a uniform coating film without uneven coating, and formation of a low-refractive-index layer showing a particularly excellent adhesion to objects to be coated.

The method for preparing the coating solution for low-refractive-index layer is not particularly limited. For example, it may be prepared by mixing components such as the above mentioned (meth) acrylic monomer, hollow silica particles, reactive silica particles, antifouling agents, and solvent, and optionally a photopolymerization initiator and the like. The components may be mixed by any known method such as a paint shaker or a bead mill.

The coating solution for low-refractive-index layer is coated on a hard coat layer described below to form a coating film, and the coating film is dried and then cured by irradiation with ionizing radiation and/or heating. Thereby, the low-refractive-index layer is formed.

The method for applying the coating solution for low-refractive-index layer is not particularly limited, and examples thereof variously include a spin coating method, a dipping method, a spraying method, a die coating method, a gravure coating method, a bar coating method, a roll coater method, a meniscus coater method, a screen printing method, and a bead coater method.

(Light-Transmitting Substrate)

The antireflection film of the claimed invention contains a light-transmitting substrate.

The light-transmitting substrate preferably has smoothness and heat resistance and is preferably excellent in mechanical strength. Specific examples of the material forming the light-transmitting substrate include thermoplastic resins such as polyesters (polyethylene terephthalate, polyethylene naphthalate), cellulose triacetate, cellulose diacetate, cellulose acetate butyrate, polyamides, polyimides, polyether sulfones, polysulfones, polypropylenes, polymethylpentens, polyvinyl chlorides, polyvinyl acetals, polyetherketones, polymethylmethacrylate, polycarbonate, and polyurethanes. Preferable among these are polyesters (polyethylene terephthalate, polyethylene naphthalate) and cellulose triacetate.

The thermoplastic resin used for the light-transmitting substrate preferably has a flexible film form. Alternatively, the thermoplastic resin in a plate form or a glass plate may be used when curability is required.

Other examples of the light-transmitting substrate are amorphous olefin polymer (Cyclo-Olefin-Polymer: COP) films containing an alicyclic structure. Substrates of this type contain a polymer such as a norbornene polymer, a monocyclic olefin polymer, a cyclic conjugated diene polymer, or a vinyl alicyclic hydrocarbon polymer. Specific examples include ZEONEX and ZEONOR (norbornene resins) produced by Zeon Coporation, SUMILITE FS-1700 produced by Sumitomo Bakelite Co., Ltd., ARTON (modified norbornene resin) produced by JSR, APEL (cyclic olefin copolymer) produced by Mitsui Chemicals, Inc., Topas (cyclic olefin copolymer) produced by Ticona, and OPTOREZ OZ-1000 series (alicyclic acrylic resin) produced by Hitachi Chemical Co., Ltd.

Also, preferable for an alternate material for triacetyl cellulose is the FV series (films with a low birefringence and a low light elastic modulus) produced by Asahi Kasei Chemicals Corporation.

The thickness of the light-transmitting substrate is preferably 10 to 300 µm. The lower limit thereof is more preferably 20 µm and the upper limit is more preferably 100 µm. In the case of using a light-transmitting substrate in a plate form, the upper limit may exceed the above limits. The light-transmitting substrate may be subjected to a physical treatment (e.g. a corona discharge treatment, an oxidation treatment, saponification) or may be coated with a coating called an anchoring agent or a primer on the surface in order to achieve an improved adhesion, before a hard coat layer and the like described below is formed thereon.

(Hard Coat Layer)

The antireflection film of the claimed invention contains a hard coat layer between the light-transmitting substrate and the low-refractive-index layer.

The "hard coat layer" herein refers to a coating layer showing a "H" or higher hardness in the pencil hardness test defined by JIS 5600-5-4 (1999). The film thickness of the hard coat layer (cured) is 0.1 to 100 µm, and preferably 1.0 to 10 µm.

The hard coat layer is not particularly limited, and for example, is formed using a composition for hard coat layer which contains a resin and optional ingredients.

The resin preferably has transparency, and specific examples thereof include ionizing radiation-curable resins which are cured by UV light or electron beams, mixtures of an ionizing radiation-curable resin and a solvent drying-type resin (a resin which forms a film only by drying a solvent added therein for adjustment of the solid content before coating), and thermosetting resins. Preferable among these are ionizing radiation-curable resins.

Specific examples of the ionizing radiation-curable resin include resins containing an acrylate functional group, such as monomers, oligomers, and prepolymers of a (meth)acrylate or the like of relatively low molecular weight polyfunctional compounds such as polyester resins, polyether resins, acrylic resins, epoxy resins, and urethane resins; and reactive diluents.

Preferable examples of such a resin include polymers or copolymers of at least one monomer selected from the group consisting of pentaerythritol tri(meth)acrylate, dipentaerythritol hexa(meth)acrylate, pentaerythritol tetra(meth)acrylate, dipentaerythritol penta(meth)acrylate, trimethylolpropane tri(meth)acrylate, dipentaerythritol tetra(meth)acrylate, and isocyanuric acid EO-modified tri(meth)acrylate. In addition, the resins used for the low reflectance layer may also be used for a hard coat layer.

In the case of using the ionizing radiation-curable resin as a UV curable resin, a photopolymerization initiator is preferably added thereto.

Examples of the photopolymerization initiator include acetophenones, benzophenones, Michler's benzoyl benzoate, α-amyloxim ester, tetramethyl thiuram monosulfide, and thioxanthones.

Additionally, the photopolymerization initiator is preferably used with a photosensitizer whose specific examples include n-butyl amine, triethyl amine, and poly-n-butyl phosphine.

Examples of the solvent drying-type resin added to the ionizing radiation-curable resin are mainly thermoplastic resins. The thermoplastic resins are not particularly limited, and conventional resins are usable.

Addition of the solvent drying-type resin effectively prevents defects of the coating surface of the coating film. In the case that a cellulose resin such as cellulose triacetate is used for the light-transmitting substrate of a preferable aspect of the present invention, preferable specific examples of the thermoplastic resin include cellulose resins such as nitrocellulose, acetylcellulose, cellulose acetate propionate, and ethyl hydroxy ethyl cellulose.

Examples of the thermosetting resin include phenolic resins, urea resins, diallyl phthalate resins, melanin resins, guanamine resins, unsaturated polyester resins, polyurethane resins, epoxy resins, aminoalkyd resins, melamine-urea cocondensated resins, silicone, and polysiloxane resins.

In the case of using the thermosetting resin, curing agents such as crosslinking agents and polymerization initiators, polymerization accelerants, solvents, viscosity conditioning agents, and the like may be optionally added thereto.

The hard coat layer is formed by applying a composition for hard coat layer prepared from the above ingredients on the light-transmitting substrate to form a coating film, drying the coating film optionally, and then curing the film by ionizing radiation irradiation, heating, or the like. Examples of the preparation method of the composition for hard coat layer and the forming method of the coating film include the same methods as those of the low-refractive-index layer.

(Other Layers)

The antireflection film of the claimed invention may contain an antiglare layer.

The antiglare layer refers to a layer that has a roughness formed by an antiglare agent included therein on the surface and reduces the reflection on the surface of the antireflection film of the claimed invention.

The antiglare layer is not particularly limited, and examples thereof include antiglare layers formed from an antiglare layer composition containing a resin and an antiglare agent.

In an aspect of the antireflection film of the claimed invention, the antiglare layer preferably satisfies all of the following formulas in which R (μm) denotes an average particle size of the fine particles of the antiglare agent, Rz (μm) denotes a ten-point average roughness of the roughness of the antiglare layer, Sm (μm) denotes an average spacing of the surface roughness thereof, and θa denotes an average angle of the inclination of the roughness.

$$30 \leq Sm \leq 600$$

$$0.05 \leq Rz \leq 1.60$$

$$0.1 \leq \theta a \leq 2.5$$

$$0.3 \leq R \leq 15$$

In another preferable aspect of the claimed invention, the antiglare layer preferably satisfies the relationship of $\Delta n = |n1 - n2| < 0.1$, in which n1 and n2 denote the refractive indexes of the antiglare agent and the resin, respectively. In addition, the haze value of the inside of the antiglare layer is preferably 55% or lower. The haze value due to the surface roughness is preferably 10% or lower, and more preferably 3% or lower.

The film thickness of the antiglare layer (cured) is preferably 0.1 to 100 μm. The lower limit is more preferably 0.8 μm, and the upper limit is more preferably 10 μm. A film thickness within this range allows the antiglare layer to show its functions sufficiently.

Examples of the type of the antiglare agent include fine particles. The preferable shape thereof is not particularly limited, and for example, spherical, elliptical, or the like. Spherical fine particles are more preferably used.

The antiglare agent formed from fine particles may contain inorganic ingredients or organic ingredients. The fine particles preferably show an antiglare property and are preferably transparent.

Specific examples of the fine particles containing inorganic ingredients include silica beads.

Specific examples of the fine particles containing organic ingredients include plastic beads such as styrene beads (refractive index: 1.59), melamine beads (refractive index: 1.67), acrylic beads (refractive index: 1.49), acrylic-styrene beads (refractive index: 1.54), and polycarbonate beads.

The amount of the antiglare agent of the antiglare layer is preferably 2 to 30 parts by mass based on 100 parts by mass of the resin in the antiglare layer. The lower limit is more preferably 3 parts by mass, and the upper limit is more preferably 15 parts by mass.

The resin forming the antiglare layer is not particularly limited, and examples thereof include the same resins as those of the hard coat layer, namely, ionizing radiation-curable resins which are cured with UV light or electron beams, mixtures of an ionizing radiation-curable resin and a solvent drying-type resin, and thermosetting resins.

The antireflection film of the claimed invention may further contain optional layers as needed, such as another hard coat layer, an antistatic layer, an antifouling layer, a high-refractive index layer, a middle-refractive-index layer, and the like, on the light-transmitting substrate in addition to the antiglare layer. Each of the antifouling layer, high-refractive-index layer, and middle-refractive-index layer may be formed with a known method, using a composition containing a generally usable antifouling agent, high-refractive-index agent, middle-refractive-index agent, low-refractive-index agent, or resin.

Among these layers, an antistatic layer is preferably formed in the antireflection film of the claimed invention.

The antistatic layer may be a conventional one, and examples thereof include an antistatic layer in which a binder resin containing an antistatic agent is used.

Examples of the binder resin include the same resins as those for the hard coat layer.

The antistatic agent of the antistatic layer is not particularly limited, and examples thereof include cationic compounds such as quaternary ammonium salts, pyridinium salts, and cationic compounds containing a cationic group such as primary to tertiary amino groups; anionic compounds containing an anionic group such as a sulfonate group, a sulfate group, a phosphate group, and a phosphonate group; ampholytic compounds such as amino acid compounds and aminosulfate compounds; nonionic compounds such as amino alcohol compounds, glycerin compounds, and polyethylene glycol compounds; organic metal compounds such as alkoxides of tin and alkoxides of titanium; and metal chelate compounds such as acetylacetonate salts of the above organic metal compounds. In addition, compounds formed by polymerizing the compounds listed above can also be included. Furthermore, examples of the antistatic agent also include polymerizable compounds such as organic metal compounds (e.g. coupling agents that contain a tertiary amino group, quaternary ammonium group, or metal chelate portion, and also contain a monomer, oligomer, or functional group polymerizable with ionizing radiation).

The antistatic agent may be conductive metal oxide particles. Examples of the conductive metal oxide particles include particles of ZnO (refractive index: 1.90, hereinafter, all the values in the parentheses show refractive indexes), $Sb_2O_2$ (1.71), $SnO_2$ (1.997), $CeO_2$ (1.95), an indium tin oxide (abbreviated as ITO, 1.95), $In_2O_3$ (2.00), $Al_2O_3$ (1.63), an antimony-doped tin oxide (abbreviated as ATO, 2.0), and an aluminum-doped zinc oxide (abbreviated as AZO, 2.0).

The antistatic agent may also be a conductive polymer. The conductive polymer is not particularly limited, and examples thereof include aromatic conjugated polymers such as poly (para-phenylene), heterocyclic conjugated polymers such as polypyrrole and polythiophene, aliphatic conjugated polymers such as polyacetylene, hetero atom-containing conjugated polymers such as polyaniline, mixed conjugated polymers such as poly(phenylenevinylene), multi-chain conjugated polymers containing multiple conjugated chains in a molecule, and conducting composite polymers obtained by graft copolymerization or block copolymerization of a conjugated polymer chain and a saturated polymer.

The amount of the antistatic agent is preferably 0.5 to 200 parts by mass based on 100 parts by mass of the binder resin forming the antistatic layer. The upper limit is more preferably 150 parts by mass, and the lower limit is more preferably 1 part by mass. An antistatic agent in an amount within the range allows giving an antistatic property with the antireflection film kept transparent.

The thickness of the antistatic layer is preferably 0.01 to 20 μm, and the upper limit thereof is more preferably 10 μm and the lower limit is more preferably 0.05 μm.

Such an antistatic layer may be formed by a known method using the binder resin and the antistatic agent.

The total light transmittance of the antireflection film of the claimed invention is preferably 90% or higher. When the antireflection film is mounted on a display surface, a total light transmittance of lower than 90% may deteriorate the color reproducibility and the visibility. The total light transmittance is more preferably 95% or higher, and further preferably 98% or higher.

The haze value of the antireflection film of the claimed invention is preferably lower than 1%, and more preferably lower than 0.5%.

The antireflection film of the claimed invention having the above structure is produced by forming a hard coat layer on the light-transmitting substrate with the above method, and then forming a low-refractive-index layer on the hard coat layer using the coating solution for low-refractive-index layer.

Such a method for producing an antireflection film of the claimed invention is also an aspect of the claimed invention.

The method for producing an antireflection film of the claimed invention is a method for producing an antireflection film that includes a hard coat layer and a low-refractive-index layer on alight-transmitting substrate, including the step of applying a coating solution for low-refractive-index layer on the hard coat layer, and drying and curing the resultant coating film to form the low-refractive-index layer on the hard coat layer, the hard coat layer being formed on the light-transmitting substrate, the coating solution containing a (meth)acrylic monomer, hollow silica particles, reactive silica particles, two kinds of antifouling agents, and a solvent, the hollow silica particles having an average particle size of 40 to 80 nm and a blending ratio to the (meth)acrylic monomer, represented by a ratio: Amount of hollow silica particles/ Amount of (meth)acrylic resin, of 0.9 to 1.4, the amount of the reactive silica particles being 5 to 60 parts by mass based on 100 parts by mass of the (meth)acrylic monomer, the antifouling agents including an antifouling agent that contains a fluorine compound and an antifouling agent that contains a fluoro-silicone compound, the solvent being a mixed solvent of methyl isobutyl ketone and propylene glycol monomethyl ether.

Examples of the ingredients and preparation methods of the coating solution for low-refractive-index layer, and examples of the forming methods of the hard coat layer and the low-refractive-index layer include the same methods as those of the low-refractive-index layer and the hard coat layer.

The antireflection film of the claimed invention may be formed into a polarizer by placing the antireflection film of the claimed invention on the surface of a polarizing element such that the side not having the low refractive index layer of the antireflection film faces the polarizing element. Such a polarizer is also an aspect of the claimed invention.

The polarizing element is not particularly limited, and examples thereof include a polyvinyl alcohol film, a polyvinyl formal film, a polyvinyl acetal film, and an ethylene-vinyl acetate copolymer saponified film, which are dyed with iodine or the like and then extended.

In laminating processes of the polarizing element and the antireflection film of the claimed invention, the light-transmitting substrate (preferably, triacetyl cellulose film) is preferably subjected to saponification. Saponification improves adhesion and provides an antistatic effect.

Another aspect of the claimed invention is an image display device including the antireflection film or the polarizer on the outermost surface. The image display device may be a non-self-luminous display device such as LCD, or a self-luminous display device such as PDP, FED, ELD (organic EL, inorganic EL), and CRT.

An LCD, which is a typical example of the non-self-luminous type, contains a transmissive display and a lighting system irradiating the transmissive display from the back. An LCD used for the image display device of the claimed invention contains the antireflection film of the claimed invention or the polarizer of the claimed invention on the transmissive display surface.

In the liquid crystal display device containing the antireflection film of the claimed invention, the lighting system emits light from the bottom side of an optical laminated body. In the case of an STN liquid crystal display device, the display device may contain a retarder between a liquid crystal display element and a polarizer. Such a liquid crystal display device may contain an adhesive layer between each of the layers.

A PDP, which is a self-luminous display device, contains a surface glass substrate (an electrode is formed on the surface) and a back glass substrate (an electrode and fine grooves are formed on the surface and red, green, and blue phosphor layers are formed in the grooves) facing the glass substrate, having a discharge gas therebetween. A PDP of the image display device of the claimed invention contains the antireflection film on the surface of the surface glass substrate or on a front plate (glass substrate or film substrate).

The self-luminous display device may be an ELD device in which a substance emitting light when a voltage is applied, namely, a light emitter such as zinc sulfide or a diamine, is deposited on a glass substrate and the voltage applied to the substrate is controlled to display images; or may be an image display device such as a CRT, in which electrical signals are converted into light to generate visible images. In these cases, the antireflection film is mounted on the outermost surface of each display device or on the surface of the front plate thereof.

Any image display devices of the claimed invention may be used for a display of televisions, computers, word processors, and the like. The image display devices are especially suitable for the surface of displays for high-resolution images, such as CRTs, liquid crystal panels, PDPs, ELDs, and FEDs.

Advantageous Effects of Invention

Having such a structure, the antireflection film of the claimed invention has a sufficient surface hardness and a sufficient slip property, contains a low-refractive-index layer with a sufficiently low refractive index, and is excellent in antireflection performance and antifouling performance such as fingerprint removability and marker repellency. Accordingly, the antireflection film of the claimed invention may be suitably used for cathode ray tube displays (CRT), liquid crystal displays (LCD), plasma displays (PDP), electroluminescence displays (ELD), field emission displays (FED), and the like.

BRIEF DESCRIPTION OF THE DRAWING

The drawing shows a cross section of an antireflection film of the present invention on a transparent substrate.

DESCRIPTION OF EMBODIMENTS

Details of the claimed invention are described in the following examples to which the scope of the claimed invention is not limited. The units "part" and "%" are based on mass, unless specifically stated otherwise.

EXAMPLE 1

A composition for hard coat layer containing the following components, having a wet weight of 30 g/m$^2$ (dry weight: 15 g/m$^2$), was applied to one side of a cellulose triacetate film (thickness: 80 μm) to form a coating film. The obtained coating film was dried at 50° C. for 30 sec, and then irradiated with UV light with a dose of 50 mJ/cm$^2$ to form a hard coat layer.
(Hard Coat Layer Composition)
Urethane Acrylates:
(BS371, produced by Arakawa Chemical Industries, Ltd., solid content: 70%): 4.0 parts by mass
(UV1700B, produced by The Nippon Synthetic Chemical Industry Co., Ltd., solid content: 70%): 12.0 parts by mass
Polymerization initiator (IRGACURE 184, produced by BASF): 0.6 parts by mass
Methyl ethyl ketone: 5.6 parts by mass
Leveling agent (DEFENSA MCF350-5, produced by DIC, solid content: 5%): 0.2 parts by mass Subsequently, on the hard coat layer was applied a coating solution for low-refractive-index layer containing the following components in an amount such that the film thickness after drying (at 25° C.×1 min to 50° C.×1 min) was 0.1 μm to form a film. The film was cured with UV light irradiation with an irradiation dose of 192 mJ/m$^2$ using a UV irradiator (produced by Fusion UV Systems Japan KK, light source: H bulb) to form a low-refractive-index layer, thereby producing an antireflection film. The film thickness of the low-refractive-index layer was adjusted such that the minimum value of the reflectance was at a wavelength of around 550 nm.

(Coating Solution for Low-Refractive-Index Layer)
Pentaerythritol triacrylate (PETA): 100.0 parts by mass
Hollow silica particles (THRULYA 4320, solid content: 20%, produced by JGC Catalysts and Chemicals Ltd., average particle size: 60 nm): 600.0 parts by mass
Reactive silica particles (MIBK-SD, solid content: 30%, produced by Nissan Chemical Industries, Ltd., average particle size: 10 nm): 133.3 parts by mass
Fluorine compound (RS-74, solid content: 20%, produced by DIC): 60.0 parts by mass
Fluoro-silicone compound (TU2225, solid content: 15%, produced by JSR): 32.8 parts by mass
Photopolymerization initiator (IRGACURE 127, produced by BASF): 7.0 parts by mass
Methyl isobutyl ketone: 6168.6 parts by mass
Propylene glycol monomethyl ether: 2870.8 parts by mass

EXAMPLE 2

An antireflection film was obtained in the same manner as in Example 1 except for using dipentaerythritol hexaacrylate (DPHA) instead of PETA in the coating solution for low-refractive-index layer.

EXAMPLE 3

An antireflection film was obtained in the same manner as in Example 1 except that the amount of the hollow silica particles in the coating solution for low-refractive-index layer was changed to 500.0 parts by mass.

EXAMPLE 4

An antireflection film was obtained in the same manner as in Example 1 except that the amount of the hollow silica particles in the coating solution for low-refractive-index layer was changed to 675.0 parts by mass.

EXAMPLE 5

An antireflection film was obtained in the same manner as in Example 1 except that the amount of the reactive silica particles in the coating solution for low-refractive-index layer was changed to 33.3 parts by mass.

EXAMPLE 6

An antireflection film was obtained in the same manner as in Example 1 except that the amount of the reactive silica particles in the coating solution for low-refractive-index layer was changed to 183.3 parts by mass.

EXAMPLE 7

An antireflection film was obtained in the same manner as in Example 1 except for using hollow silica particles with an average particle size of 40 nm in the coating solution for low-refractive-index layer.

EXAMPLE 8

An antireflection film was obtained in the same manner as in Example 1 except for using hollow silica particles with an average particle size of 80 nm in the coating solution for low-refractive-index layer.

COMPARATIVE EXAMPLE 1

An antireflection film was obtained in the same manner as in Example 1 except for using hollow silica particles with an average particle size of 30 nm in the coating solution for low-refractive-index layer.

COMPARATIVE EXAMPLE 2

An antireflection film was obtained in the same manner as in Example 1 except for using hollow silica particles with an average particle size of 90 nm in the coating solution for low-refractive-index layer.

COMPARATIVE EXAMPLE 3

An antireflection film was obtained in the same manner as in Example 1 except that the amount of the hollow silica particles was changed to 400.0 parts by mass in the coating solution for low-refractive-index layer.

COMPARATIVE EXAMPLE 4

An antireflection film was obtained in the same manner as in Example 1 except that the amount of the reactive silica particles was changed to 233.3 parts by mass in the coating solution for low-refractive-index layer.

COMPARATIVE EXAMPLE 5

An antireflection film was obtained in the same manner as in Example 1 except that the reactive silica particles were not added to the coating solution for low-refractive-index layer.

COMPARATIVE EXAMPLE 6

An antireflection film was obtained in the same manner as in Example 1 except that the fluorine compound was not added to the coating solution for low-refractive-index layer and that the amount of the fluoro-silicone compound was changed to 6.0 parts by mass.

COMPARATIVE EXAMPLE 7

An antireflection film was obtained in the same manner as in Example 1 except that the amount of the fluorine compound was changed to 6.0 parts by mass in the coating solution for low-refractive-index layer and that the fluoro-silicone compound was not added.

COMPARATIVE EXAMPLE 8

An antireflection film was obtained in the same manner as in Example 1 except for using a fluororesin (LINC-3A-MI20, produced by Kyoeisha Chemical Co., Ltd.) instead of PETA in the coating solution for low-refractive-index layer.

COMPARATIVE EXAMPLE 9

An antireflection film was obtained in the same manner as in Example 1 except for using silica particles not having reactive functional groups on the surface (MEK-ST, produced by Nissan Chemical Industries, Ltd.) instead of the reactive silica particles in the coating solution for low-refractive-index layer.

COMPARATIVE EXAMPLE 10

An antireflection film was obtained in the same manner as in Example 1 except that the amount of the hollow silica particles was changed to 800.0 parts by mass in the coating solution for low-refractive-index layer.

COMPARATIVE EXAMPLE 11

An antireflection film was obtained in the same manner as in Example 1 except that the amount of the reactive silica particles was changed to 9.99 parts by mass in the coating solution for low-refractive-index layer.

REFERENCE EXAMPLE 1

An antireflection film was obtained in the same manner as in Example 1 except for using reactive silica particles with an average particle size of 40 nm (MIBK-SDL, produced by Nissan Chemical Industries, Ltd.) in the coating solution for low-refractive-index layer.

REFERENCE EXAMPLE 2

An antireflection film was obtained in the same manner as in Example 1 except for using n-butanol instead of the propylene glycol monomethyl ether in the coating solution for low-refractive-index layer.

The antireflection films obtained in the examples, comparative examples, and reference examples were subjected to the following evaluations. Table 1 shows the results.

(Reflectance value Y)

A black tape was attached to each antireflection film to prevent back surface reflection. The 5° specular reflectance of each resulting antireflection film was measured from the side of the low-refractive-index layer in a wavelength range of 380 to 780 nm using a spectral reflectance meter called "MPC3100" produced by Shimadzu Corporation. The obtained values were each converted into a luminous reflectance, reflectance value Y, which is a brightness value perceived by human eyes, using a software (built into MPC 3100). The obtained reflectance values Y were evaluated according to the following criteria:

Excellent: lower than 1.0%
Good: 1.0 to 1.5%
Poor: higher than 1.5%.

(Antifouling Property)

The surface of each antireflection film was marked with a fingerprint. The marks were wiped off with Kimwipe (registered trademark, produced by Nippon Paper Crecia Co., Ltd.) moved reciprocally for 30 times. The removability (degree of the fingerprint remaining) was visually evaluated according to the following criteria:

Excellent: perfectly wiped off with reciprocal wiping for 10 times or less
Good: perfectly wiped off with reciprocal wiping for 30 times or less
Poor: cannot be wiped off with reciprocal wiping for 30 times.

(Scratch Resistance)

The low-refractive-index layer surface of the antireflection film was rubbed with #0000 steel wool moved reciprocally for 10 times at friction loads of 500 g/cm$^2$ and 300 g/cm$^2$. The peeling of the coating film was visually observed and evaluated according to the following criteria:

Excellent: no scratches were observed at a friction load of 500 g/cm$^2$
Good: some scratches were observed at a friction load of 500 g/cm$^2$ but no scratches at a friction load of 300 g/cm$^2$
Poor: scraches were observed at a friction load of 300 g/cm$^2$.

(Aggregation Defect)

A black PET film was coated on the surface of each antireflection film on the side not having the low-refractive-index layer. The coated surface was visually observed from the low-refractive-index layer side using a three-wavelength lamp to confirm the presence of aggregation of hollow silica particles and aggregation of reactive silica particles. The evaluation was performed according to the following criteria:

Good: no aggregation defects were observed

Poor: aggregation defects were observed.

(Appearance, Whitening)

A black PET film was coated on the surface of each antireflection film on the side not having the low-refractive-index layer. The coated surface was visually observed from the low-refractive-index layer side using a three-wavelength lamp. The evaluation was performed according to the following criteria:

Good: uniform surface without whitening or color unevenness

Poor: both or either of whitening and strong color unevenness was/were observed.

Y, antifouling performance, scratch resistance, aggregation defect, appearance, and whitening.

In contrast, the antireflection film of Comparative Example 1, having hollow silica particles with an average particle size of 30 nm, was poor in antireflection performance, and the antireflection film of Comparative Example 2, having hollow silica particles with an average particle size of 90 nm, was poor in scratch resistance.

The antireflection film of Comparative Example 3, having a blending ratio of the hollow silica particles to the (meth) acrylic resin of 0.80, and the antireflection film of Comparative Example 4, having 70 parts by mass of the reactive silica particles based on 100 parts by mass of the (meth) acrylic resin, were poor in antireflection performance.

The antireflection film of Comparative Example 5, not containing reactive silica particles, was poor in scratch resistance.

The antireflection film of Comparative Example 6, not containing a fluorine compound as an antifouling agent, was poor in antifouling performance, and the antireflection film of Comparative Example 7, not containing a fluoro-silicone

TABLE 1

| | PV Ratio (*1) | Average particle diameter of hollow silica particles (*3) | Average particle diameter of reactive silica particles (*4) | Amount of reactive silica particles (*6) | Y value | Antifouling performance | Steel wool (SW) resistance | Aggregation defect | Appearance, whitening |
|---|---|---|---|---|---|---|---|---|---|
| Example 1 | 1.20 | 60 nm | 10 nm | 40 parts by mass | Good | Good | Good | Good | Good |
| Example 2 | 1.20 | 60 nm | 10 nm | 40 parts by mass | Good | Good | Good | Good | Good |
| Example 3 | 1.00 | 60 nm | 10 nm | 40 parts by mass | Good | Good | Good | Good | Good |
| Example 4 | 1.35 | 60 nm | 10 nm | 40 parts by mass | Good | Good | Good | Good | Good |
| Example 5 | 1.20 | 60 nm | 10 nm | 10 parts by mass | Good | Good | Good | Good | Good |
| Example 6 | 1.20 | 60 nm | 10 nm | 55 parts by mass | Good | Good | Good | Good | Good |
| Example 7 | 1.20 | 40 nm | 10 nm | 40 parts by mass | Good | Good | Good | Good | Good |
| Example 8 | 1.20 | 80 nm | 10 nm | 40 parts by mass | Good | Good | Good | Good | Good |
| Comparative Example 1 | 1.20 | 30 nm | 10 nm | 40 parts by mass | Poor | Good | Good | Good | Good |
| Comparative Example 2 | 1.20 | 90 nm | 10 nm | 40 parts by mass | Excellent | Good | Poor | Good | Good |
| Comparative Example 3 | 0.80 | 60 nm | 10 nm | 40 parts by mass | Poor | Good | Excellent | Good | Good |
| Comparative Example 4 | 1.20 | 60 nm | 10 nm | 70 parts by mass | Poor | Good | Good | Good | Good |
| Comparative Example 5 | 1.20 | 60 nm | — | 0 parts by mass | Good | Good | Poor | Good | Good |
| Comparative Example 6 | 1.20 | 60 nm | 10 nm | 40 parts by mass | Good | Poor | Excellent | Good | Poor |
| Comparative Example 7 | 1.20 | 60 nm | 10 nm | 40 parts by mass | Good | Excellent | Poor | Poor | Poor |
| Comparative Example 8 | 1.20 (*2) | 60 nm | 10 nm | 40 parts by mass | Excellent | Good | Poor | Good | Poor |
| Comparative Example 9 | 1.20 | 60 nm | 10 nm (*5) | 40 parts by mass | Good | Poor | Poor | Good | Good |
| Comparative Example 10 | 1.60 | 60 nm | 10 nm | 40 parts by mass | Good | Poor | Poor | Poor | Good |
| Comparative Example 11 | 1.20 | 60 nm | 10 nm | 3 parts by mass | Good | Good | Poor | Good | Good |
| Reference Example 1 | 1.20 | 60 nm | 40 nm | 40 parts by mass | Good | Good | Poor | Good | Good |
| Reference Example 2 | 1.20 | 60 nm | 10 nm | 40 parts by mass | Good | Good | Good | Excellent | Poor |

(*1) Blending ratio of hollow silica particles to (meth)acrylic resin (amount of hollow silica particles/amount of (meth)acrylic resin)
(*2) Blending ratio of hollow silica particles to fluororesin (amount of hollow silica particles/amount of fluororesin)
(*3) Average particle diameter of hollow silica particles in low-refractive-index layer
(*4) Average particle diameter of reactive silica particles in low-refractive-index layer
(*5) Average particle diameter of silica particles not containing a reactive functional group on the surface
(*6) Amount of reactive silica particles based on 100 parts by mass of (meth)acrylic resin As shown in Table 1, the antireflection films of the examples showed excellent results in all of reflectance value compound as an antifouling agent, was poor in scratch resistance, aggregation defect, appearance, and whitening.

The antireflection film of Comparative Example 8, containing a fluororesin instead of the (meth)acrylic resin, was poor in scratch resistance.

The antireflection film of Comparative Example 9, containing silica particles not containing reactive functional groups, was poor in antifouling performance and scratch resistance.

The antireflection film of Comparative Example 10, having a blending ratio of the hollow silica particles to the (meth)acrylic resin of 1.60, was poor in antifouling performance, scratch resistance, and aggregation defect.

The antireflection film of Reference Example 1, containing reactive silica particles with an average particle size of 40 nm, was poor in scratch resistance, and the antireflection film of Reference Example 2, containing n-butanol as a solvent of the coating solution for low-refractive-index layer, was poor in the appearance and whitening.

INDUSTRIAL APPLICABILITY

The antireflection film of the claimed invention, having a low-refractive-index layer having the described structure, has a sufficient surface hardness and a slip property, provides a low-refractive-index layer with a sufficiently low refractive index low-refractive-index layer, and shows excellent antireflection performance and excellent antifouling performance such as fingerprint removability and marker repellency. Therefore, the antireflection film of the claimed invention is suitably used for cathode ray tube displays (CRT), liquid crystal displays (LCD), plasma displays (PDP), electroluminescence displays (ELD), field emission displays (FED), and the like.

The invention claimed is:
1. An antireflection film comprising
a light-transmitting substrate,
a hard coat layer, and
a low-refractive-index layer,
the hard coat layer and the low-refractive-index layer being formed on the light-transmitting substrate,
the low-refractive-index layer comprising a (meth)acrylic resin, hollow silica particles, reactive silica particles, and two kinds of antifouling agents,
the hollow silica particles having an average particle size of 40 to 80 nm and a blending ratio to the (meth)acrylic resin, represented by a ratio: Amount of hollow silica particles/Amount of (meth)acrylic resin, of 0.9 to 1.4,
the amount of the reactive silica particles being 5 to 60 parts by mass based on 100 parts by mass of the (meth)acrylic resin,
the antifouling agents including an antifouling agent that contains a fluorine compound and an antifouling agent that contains a fluoro-silicone compound.
2. The antireflection film according to claim 1, wherein the hollow silica particles have an average particle size of 45 to 70 nm.
3. The antireflection film according to claim 1,
wherein the reactive silica particles contain a UV-curable functional group and have an average particle size of 1 to 25 nm.
4. The antireflection film according to claim 1,
wherein when the blending ratio of the hollow silica particles to the (meth)acrylic resin, represented by a ratio: Amount of hollow silica particles/Amount of (meth)acrylic resin, is 0.9 to 1.1, the amount of the reactive silica particles is 5 to 40 parts by mass based on 100 parts by mass of the (meth)acrylic resin, and
when the blending ratio of the hollow silica particles to the (meth)acrylic resin is 1.1 to 1.4, the amount of the reactive silica particles is 40 to 60 parts by mass based on 100 parts by mass of the (meth)acrylic resin.
5. The antireflection film according to claim 1,
wherein the (meth)acrylic resin is a polymer or a copolymer of at least one monomer selected from the group consisting of pentaerythritol tri(meth)acrylate, dipentaerythritol hexa(meth)acrylate, pentaerythritol tetra(meth)acrylate, dipentaerythritol penta(meth)acrylate, trimethylolpropane tri(meth)acrylate, dipentaerythritol tetra(meth)acrylate, and an isocyanuric acid EO-modified tri(meth)acrylate.
6. A polarizer comprising a polarizing element,
the polarizing element comprising the antireflection film according to claim 1, on a polarizing element surface.
7. An image display device comprising the antireflection film according to claim 1, or a polarizer comprising a polarizing element,
the polarizing element comprising the antireflection film according to claim 1, on a polarizing element surface on an outermost surface.
8. A method for producing an antireflection film that includes a hard coat layer and a low-refractive-index layer on a light-transmitting substrate,
comprising the step of applying a coating solution for low-refractive-index layer on the hard coat layer, and drying and curing the resultant coating film to form the low-refractive-index layer on the hard coat layer, the hard coat layer being formed on the light-transmitting substrate, the coating solution containing a (meth)acrylic monomer, hollow silica particles, reactive silica particles, two kinds of antifouling agents, and a solvent,
the hollow silica particles having an average particle size of 40 to 80 nm and a blending ratio to the (meth)acrylic monomer, represented by a ratio: Amount of hollow silica particles/Amount of (meth)acrylic monomer, of 0.9 to 1.4,
the amount of the reactive silica particles being 5 to 60 parts by mass based on 100 parts by mass of the (meth)acrylic monomer,
the antifouling agents including an antifouling agent that contains a fluorine compound and an antifouling agent that contains a fluoro-silicone compound,
the solvent being a mixed solvent of methyl isobutyl ketone and a propylene glycol monomethyl ether.
9. The method for producing an antireflection film according to claim 8,
wherein the blending ratio between the methyl isobutyl ketone and the propylene glycol monomethyl ether, represented by a ratio: Methyl isobutyl ketone/Propylene glycol monomethyl ether, is 95/5 to 30/70.

* * * * *